United States Patent
Viaud

(10) Patent No.: US 6,594,978 B2
(45) Date of Patent: Jul. 22, 2003

(54) DEVICE FOR ADJUSTING THE WORKING HEIGHT OF A CROP PICK-UP

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 09/988,118

(22) Filed: Nov. 16, 2001

(65) Prior Publication Data

US 2002/0059787 A1 May 23, 2002

(30) Foreign Application Priority Data

Nov. 17, 2000 (DE) .......................................... 100 57 135

(51) Int. Cl.$^7$ ................................................. A01D 34/28
(52) U.S. Cl. ..................................... 56/10.2 E; 56/341
(58) Field of Search ........................... 56/10.2 R, 10.2 E,
56/10.4, 341, DIG. 3, DIG. 10, 33, 34,
208, 209; 172/4, 7, 8

(56) References Cited

U.S. PATENT DOCUMENTS

| 3,851,451 | A | * | 12/1974 | Agness et al. ............ 56/10.2 E |
| 5,155,983 | A | * | 10/1992 | Sheehan et al. .......... 56/10.2 E |
| 5,299,413 | A | | 4/1994 | Gale .......................... 56/10.2 |
| 5,713,190 | A | * | 2/1998 | Vermeulen et al. ....... 56/10.2 E |
| 5,752,374 | A | | 5/1998 | Allwörden et al. ........... 56/341 |
| 5,794,421 | A | * | 8/1998 | Maichle .................... 56/10.2 E |
| 5,913,801 | A | | 6/1999 | Böttinger et al. ............ 56/10.2 |
| 5,937,621 | A | * | 8/1999 | Eggenhaus ................ 56/10.2 E |
| 6,041,583 | A | * | 3/2000 | Goering et al. .......... 56/10.2 E |
| 6,202,395 | B1 | * | 3/2001 | Gramm .................... 56/10.2 E |

FOREIGN PATENT DOCUMENTS

| DE | 41 15 056 | 11/1992 |
| DE | 299 22 193 | 4/2001 |
| EP | 0 203 662 | 12/1986 |
| EP | 0 774 383 | 5/1997 |

OTHER PUBLICATIONS

WO 98/17096 PCT dated Apr. 30, 1998.

* cited by examiner

Primary Examiner—Robert E. Pezzuto

(57) ABSTRACT

A large round baler is equipped with a pick-up mounted to the baler frame for being raised and lowered relative to the ground by operation of a hydraulic cylinder. The pick-up is maintained at a desired working height by a control arrangement including at least one height sensor which sends a signal corresponding to the instant height of the pick-up above the ground to a signal processing unit which compares the height signal with a stored value corresponding to a desired height, the signal processing unit the sending a control signal for controlling a solenoid-operated valve in such a way that the hydraulic cylinder is caused to move the pick-up in the required direction for maintaining the desired height.

9 Claims, 1 Drawing Sheet

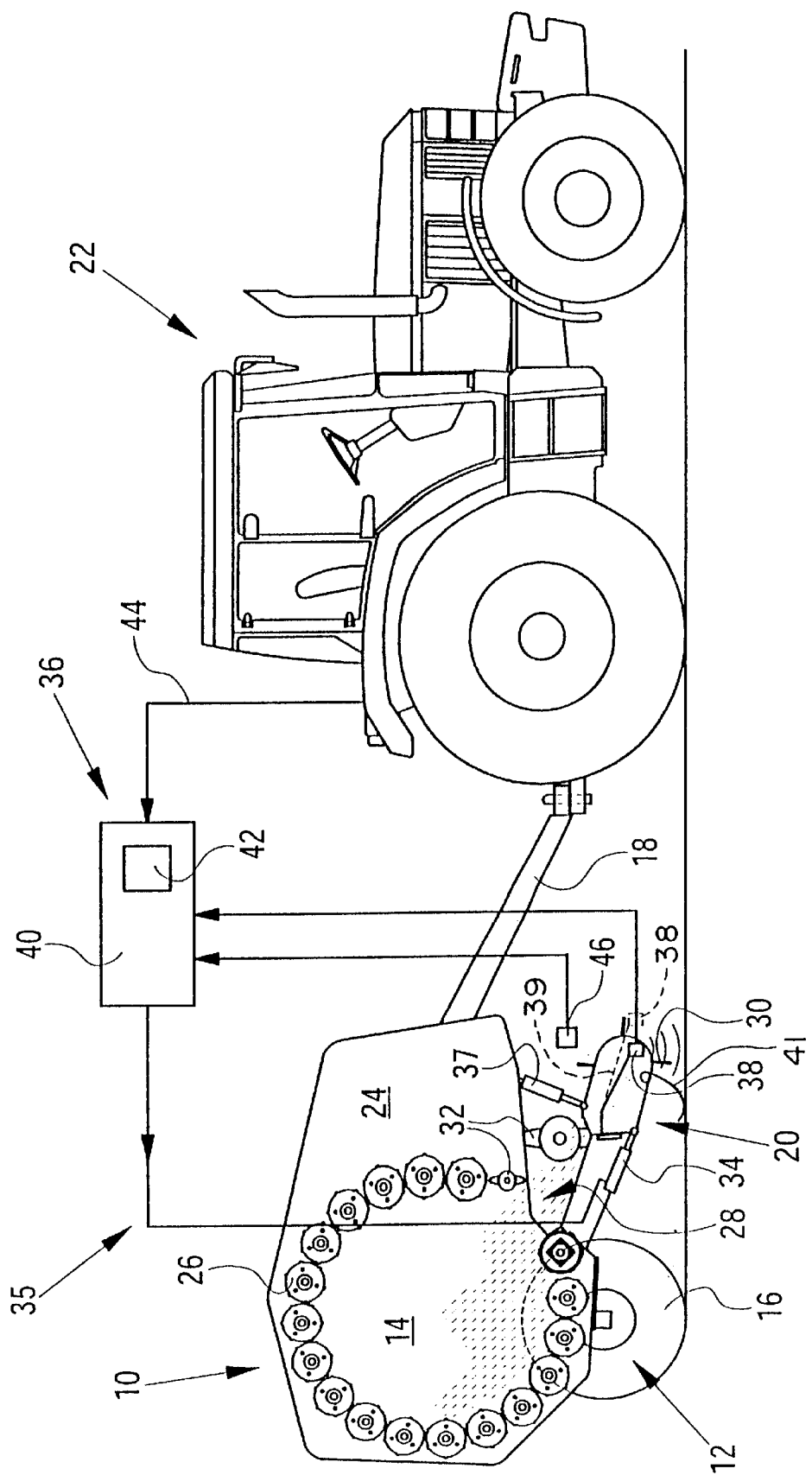

DEVICE FOR ADJUSTING THE WORKING HEIGHT OF A CROP PICK-UP

FIELD OF THE INVENTION

The invention pertains to a device for adjusting a crop pick-up on an agricultural baling press, with the adjustment device containing an adjustment mechanism for varying the distance between the pick-up and the ground.

BACKGROUND OF THE INVENTION

Baling presses, in particular, modern round balers according to WO-A1-98/17096, are provided with so-called pick-ups that are intended for picking up the widest swaths possible in order to achieve a high cropping capacity. In order to ensure that the pick-up always maintains a certain distance from the ground, the pick-up is provided with support wheels that can be mounted on the pick-up in different positions. However, this desired spacing of the pick-up from the ground is not achieved when ground conditions are such that the pick-up sinks into the ground and its tines engage the ground. The support wheels are laterally adjustable so that they do not protrude beyond the lateral dimensions of the baling press during its transport.

The problem to be solved by the invention is the considerable structural expense associated with the mounting and adjustment of the support wheels and the fact that the wheels sometimes do not achieve the desired spacing, and crop sometimes builds up around the wheel support structure.

SUMMARY OF THE INVENTION

According to the present invention, there is provided an improved pick-up height adjusting device.

A broad object of the invention is to provide a pick-up height adjusting device that is relatively inexpensive and easily operated to achieve reliable, adjustable height maintenance.

A more specific object of the invention is to provide a pick-up height adjusting device which eliminates the need for pick-up support wheels. This is achieved by using a contact-free height sensor such as a high-frequency or ultrasonic sensor.

Another object of the invention is to provide an alternate sensor, which while in contact with the ground, is in the form of a feeler having the ability to penetrate dense weeds which cause the contact-free sensor to deliver a false height signal.

These and other objects will become apparent from a reading of the ensuing description together with the appended drawing.

BRIEF DESCRIPTION OF THE DRAWINGS

The sole FIGURE is a schematic right side view of a large round baler and towing tractor, with the baler having a pick-up equipped with a height adjusting device constructed in accordance with the principles of the present invention.

DESCRIPTION OF THE PREFERRED EMBODIMENT

Referring now to the drawing, there is shown a baling press 10 having a frame 12, a baling chamber 14, wheels 16, a hitch 18 and a pick-up 20, with the hitch 18 being coupled to the drawbar of a towing vehicle 22.

In the embodiment shown, the baling press 10 is realized in the form of a round baler, with the baling chamber 14 being of a fixed size. Alternatively, the baling press 10 may also have a different design, e.g., in the form of a round baler with a baling chamber of variable size, a baling press for producing small or large square bales, or a similar towed machine with a pick-up.

The baling press frame 12 is realized in the form of a welded frame and carries side walls 24, between which roll-like pressing elements 26 extend.

The baling chamber 14 is closed on the ends by the side walls 24 and on the circumference by the pressing elements 26. The pressing elements 26 are arranged so that an inlet 28, through which the crop can be fed into the baling chamber 14, remains situated on the lower front side.

The wheels 16 support the frame 12 and the entire baling press 10 on the ground. The hitch 18 serves for connecting the frame 12 to the towing vehicle 22 and essentially extends horizontally above the pick-up 20.

The pick-up 20 is realized conventionally, i.e., it is equipped with several revolving rows of spring-loaded prongs 30. These prongs revolve above the ground so that the crop is lifted off the ground and transported toward the rear, i.e., to the inlet 28. Although this is not absolutely imperative, a rotary conveyor 32 is provided between the pick-up 20 and the inlet 28. The pick-up 20 is conventionally mounted on the frame 12 so that it can be pivoted and adjusted vertically by means of an adjustment mechanism 34 that forms part of an adjusting device 35.

The position of the pick-up 20 should be chosen so that the prongs 30 turn a short distance above the ground. However, this applies to the entire width of the pick-up 20. This is intended to prevent the pick-up from being lowered when part or all of the pick-up briefly moves over a depression or the like. On the other hand, the pick-up 20 should be raised into the non-operating position when the baling press 10 is transported.

The adjusting device 35 contains a control unit 36 in order to control or regulate the distance between the pick-up 20 and the ground. This control unit contains a sensor 38, a signal processing unit 40, an input unit 42, a power supply 44 and various connecting lines which ultimately act upon the adjustment mechanism 34.

The adjustment mechanism 34 may be simply realized in the form of a single-action hydraulic cylinder that is controlled by a conventional solenoid-operated valve (not shown). A single-acting hydraulic motor or hydraulic cylinder suffices because the downward movement is caused by gravitational force. However, the adjustment speed can be increased by using a double-acting hydraulic cylinder. It would also be conceivable to use an electric motor with a spindle drive instead of the hydraulic cylinder. The adjustment mechanism 34 can also be operated from the towing vehicle 22 independently of the signal processing unit 40 in order to raise the pick-up 20 into its transport position and/or lower the pick-up onto the ground. In the embodiment shown, the adjustment mechanism 34 only acts over part of the maximum adjusting distance of the pick-up 20, i.e., to the extent of the required adjustment during its operation. In other respects, the pick-up 20 is able to move freely upward relative to the adjustment mechanism 34. When raising the pick-up 20 into the transport position, a servomotor 37 arranged on the pick-up 20 and the frame 12 is actuated so that the pick-up 20 is completely raised. As soon as the servomotor 37 is no longer pressurized, the pick-up 20 is lowered into a position in which it is carried by the adjustment mechanism 34. However, it is not necessary to use the servomotor 37. In instances in which no separate servomotor 37 is used, the entire movement is effected by means of the adjustment mechanism 34.

It is advantageous if the control unit 36 is partially arranged on the baling press 10 and partially arranged on the towing vehicle 22. In an embodiment variant, the control unit 36 is arranged only on the baling press 10 and can be remote-controlled from the towing vehicle 22; the control unit may be realized electrically, electronically, in accordance with CAN-bus technology or the like.

In the embodiment shown, the sensor 38 is realized in the form of a contact-free sensor 38 that transmits high-frequency or ultrasonic waves toward the ground and utilizes the reflection behavior of the waves for calculating the distance traveled. The sensor then derives a signal for the distance between the pick-up 20 and the ground from the distance traveled. In the drawing, the sensor 38 is situated within the contour of the front part of the pick-up 20. Such an arrangement may, for example, be realized by mounting the sensor 38 in the pick-up 20 between adjacent moving paths of the prongs 30. Alternatively, or additionally, the sensor 38 may be arranged in front of the pick-up 20 and carried by a corresponding arm, as indicated at 39 in broken lines. In a further alternate arrangement, for use when weeds are such as to interfere with the signal generated by the sensor 38, a sensor arrangement for replacing each sensor 38 is used and includes a sensor 41 including a feeler or sliding element, pivotally mounted to the pick-up 20, that follows the contour of the ground. It is known practice with such sensors to use a spring to bias the feeler against the ground and to use a potentiometer associated with the feeler for creating a signal for determining the distance that the pick-up is from the ground as a function of the angular displacement of the feeler. The feeler of the sensor 41 is mounted such that it may be folded to a stored position when not needed. Of course, when the ground-contacting sensors 41 are used, a signal is sent to the signal processing unit 40 for disabling the processing of any signals generated by the sensors 38 or they are somehow disabled so as not to operate at all.

In this embodiment, three sensors 38 are arranged over the width of the pick-up 20, in a manner not shown, so that one sensor is in the center and the other two are at the opposite lateral sides of the pick-up. The signal processing unit 40 selects the signal that represents the shortest distance from the ground from the signals delivered by the three sensors 38.

The signal processing unit 40 is realized in the form of an on-board computer and is usually arranged on the towing vehicle 22. If so required, the signal processing unit 40 may also be realized so that it can be detached. In this case, the signal processing unit is portable and can be used in another towing vehicle. The signal processing unit 40 is hardware- and or/ software-based; however, the signal processing unit preferably contains a computer program that allows a series of arithmetic and logic operations. Power from the power supply 44 of the towing vehicle 22 is fed to the signal processing unit 40 in order to perform the computations. In addition, the signal processing unit 40 receives the signal or signals from the sensor(s) 38 so that the current distance from the ground can be obtained or calculated. If the signal processing unit 40 receives signals from several sensors 38, the signal that corresponds to the shortest distance from the ground can be obtained or calculated. If so required, a timing element may also be used to prevent brief signal changes from negligible contour variations from being processed. A line leads from the signal processing unit 40 to the adjustment mechanism 34 in order to forward an extension or retraction signal to the adjustment mechanism.

The input unit 42 is usually realized in the form of a keyboard and is suitable for adjusting certain minimum heights or initiating certain operating states. For example, a more or less aggressive raking process to be carried out by the prongs 30 can be adjusted. In addition, the pick-up 20 can be raised into transport position. It is possible to arrange the signal processing unit 40 on the baling press 10 and to arrange the input unit 42 on the towing vehicle 22.

The power supply 44 usually consists of the 12 volt voltage source of the towing vehicle. However, it would, in principle, also be possible to realize the power supply in the form of a battery arranged in the signal processing unit 40 or in the form of a solar cell.

A deactivating device 46 is provided as part of the signal processing unit 40 in order to ensure that the pick-up 20 maintains its transport position, for example. In the embodiment shown, the deactivating device 46 is realized in the form of a contact switch that delivers a signal to the signal processing unit 40. Based on this signal, the signal processing unit 40 recognizes that the pick-up 20 has reached its transport position and should no longer be adjusted in accordance with the signals of the sensors 38.

The operation of the invention will now be discussed in accordance with the previous description.

During its operation, the baling press 10 is moved over a field with the aid of the towing vehicle 22 and is activated. The signal processing unit 40 is activated so that the sensors 38 determine the distance between the pick-up 20 and the ground and adjust the adjustment mechanism 34 in accordance with the value input by means of the input unit 42. As the baling press 10 is towed over the field, the sensors 38 recognize changes in the distance from the ground and forward this information to the signal processing unit 40, where said information is compared with a set value. Depending on the direction of the deviation, the adjustment mechanism 34 is either extended or retracted so that the actual value and the set value match. Once the pick-up 20 is raised into its transport position again by means of the servomotor 37, the software or hardware computations carried out by the signal processing unit 40 are stopped again based on the signal received from the deactivation device 46.

Having described the preferred embodiment, it will become apparent that various modifications can be made without departing from the scope of the invention as defined in the accompanying claims.

What is claimed is:

1. In combination with a towed crop processing implement including a main frame mounted on ground wheels and coupled to a towing tractor and a crop pick-up mounted to said main frame for vertical adjustment relative to the ground, an adjustment device, comprising:

an adjustment mechanism coupled between the main frame and the pick-up and being operable for effecting vertical adjustment of the pick-up in response to a height control signal;

at least one sensor for determining the height of the pick-up relative to the ground and generating a corresponding height signal;

a signal processing unit mounted on said tractor and being coupled to said at least one sensor for receiving said height signal;

an input device being coupled to said signal processing unit for placing in memory a value corresponding to a desired height of operation of said pick-up; and said signal processing unit having an output coupled to said adjustment mechanism, and being operative in response to said height for generating a height control signal which represents a variation between said value corresponding to said desired height of operation and said height signal is sent to said adjustment mechanism for causing the latter to adjust the pick-up height in accordance with said height control signal.

2. The combination, as defined in claim 1, wherein said at least one sensor is contact-free.

3. The combination, as defined in claim 1, wherein said sensor may be lowered into ground contact.

4. The combination, as defined in claim 3, wherein said sensor includes a potentiometer for determining the relative position between the sensor and the pick-up.

5. The combination, as defined in claim 1, and further including a towing vehicle hitched to said crop processing implement; and said signal processing unit being arranged on the towing vehicle.

6. The combination, as defined in claim 1, wherein said at least one height sensor is located in front of the pick-up.

7. The combination, as defined in claim 1, wherein several height sensors are arranged over a width of said pick-up; and said signal processing unit including a control section for determining and selecting only the shortest height reflected by the signals generated by said several height sensors for generating said height control signal.

8. The combination, as defined in claim 1, wherein said adjustment mechanism includes a single-acting actuator.

9. The combination, as defined in claim 1, wherein said adjustment mechanism includes a deactivating device coupled to said signal processor and operative in response to said pick-up reaching a predetermined position for deactivating the signal processing unit.

* * * * *